W. F. MILLER.
SHARPENING DEVICE FOR BLADES OF LAWN MOWER KNIVES.
APPLICATION FILED AUG. 30, 1909.
946,386.  Patented Jan. 11, 1910.
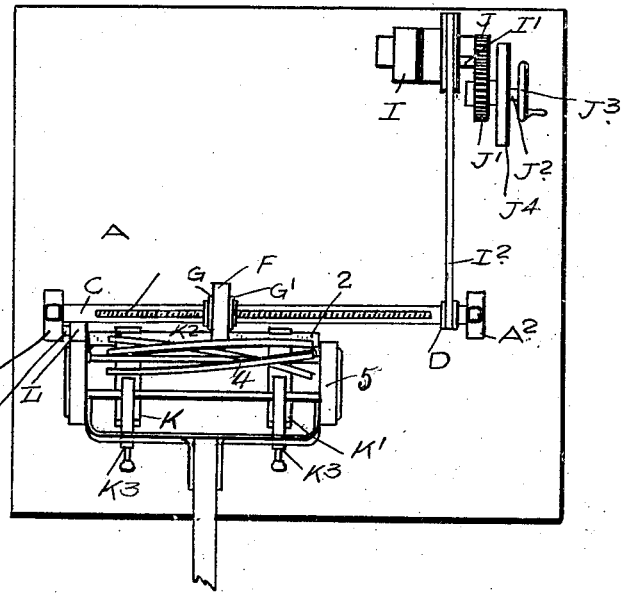
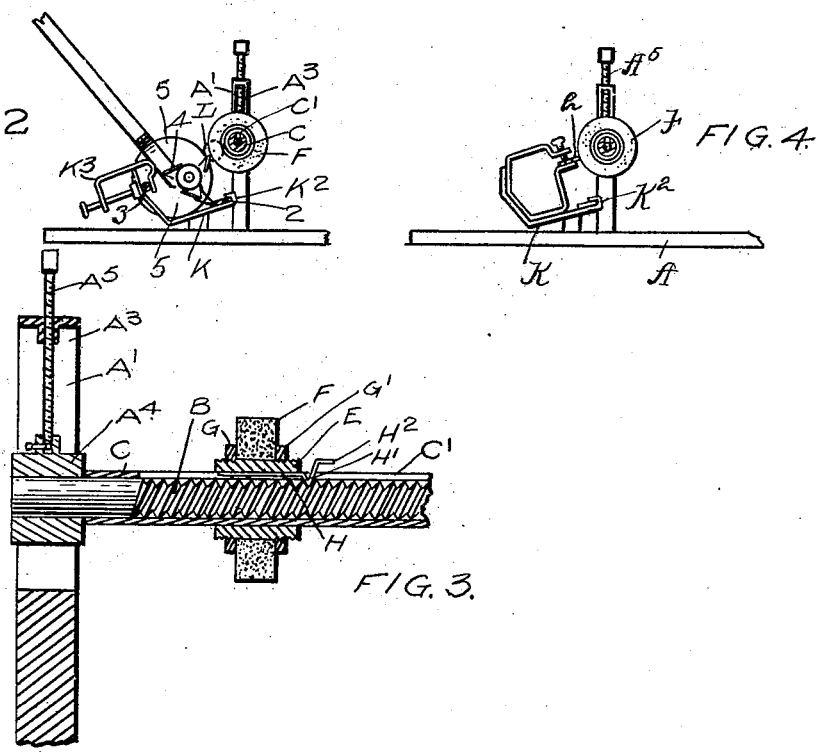
WITNESSES.  INVENTOR
W. F. MILLER

UNITED STATES PATENT OFFICE.

WILLIAM FORBES MILLER, OF TORONTO, ONTARIO, CANADA.

SHARPENING DEVICE FOR BLADES OF LAWN-MOWER KNIVES.

946,386.                Specification of Letters Patent.    Patented Jan. 11, 1910.

Application filed August 30, 1909.  Serial No. 515,359.

*To all whom it may concern:*

Be it known that I, WILLIAM FORBES MILLER, of the city of Toronto, in the county of York, in the Province of Ontario, Canada, have invented certain new and useful Improvements in Sharpening Devices for Blades of Lawn-Mower Knives, of which the following is the specification.

My invention relates to improvements in sharpening devices for blades of lawn mower knives and the object of the invention is to devise a device whereby the blades of the mower may be quickly and easily sharpened so that when finished they will be perfectly true from end to end and it consists essentially of angular brackets forming a hopper like receptacle for the mowing machine, clamping devices for holding the mower in a steady position within the brackets, a screw spindle held at each end in vertically adjustable bearings, a sleeve provided with a longitudinal slot and rotatably mounted upon the screw spindle, a supplemental sleeve encircling the aforesaid sleeve and provided with a spring depending finger designed to extend downwardly from the slot so as to enter between the threads of the screw spindle, an emery wheel mounted upon the supplemental sleeve, and driving mechanism for rotating the sleeve and mower blades as hereafter more particularly explained by the following specification.

Figure 1, represents a plan view of my device showing a lawn mower machine in position for sharpening. Fig. 2, is a cross sectional view through the mechanism and mowing machine. Fig. 3, is an enlarged sectional elevation taken through one end of the screw spindle and its supporting bearing. Fig. 4, is a sectional view similar to Fig. 2 showing how the ledger plate may be held for sharpening.

In the drawings like characters of reference indicate corresponding parts in each figure.

A is the base plate provided with standards A′ and A² having vertical slots A³.

A⁴ are bearing blocks held within the vertical slots A³ and vertically adjusted therein by means of adjusting screws A⁵.

B is a screw spindle, the ends of which are stationarily held within the bearing blocks A⁴.

C is a sleeve provided with a longitudinal slot C′. The sleeve C is rotatably mounted upon the screw spindle B.

D is a driving pulley secured on the rotatable sleeve C.

E is a sleeve slidably mounted upon the rotatable sleeve C, the outer periphery of the sleeve being threaded at each end thereof.

F is an emery wheel mounted upon the sleeve E and secured thereon by means of the washers G G′ which are threaded on the sleeve G to each side of the emery wheel F so as to lock the emery wheel F in place.

H is a spring finger preferably secured on the interior periphery of the sleeve E at one end, the opposite end of the finger protruding beyond the end of the sleeve and having a V-shape depending portion H′. The V-shape depending portion H′ extends downwardly and engages with the thread of the screw spindle B. The free end of the spring finger H is also provided with an upwardly extending portion H² forming a handle whereby the free end of the spring finger is raised so as to carry the V-shaped depending portion out of the thread of the screw and thereby free the emery wheel from engagement with the screw thread. The rotatable sleeve C may be driven by a suitable mechanism such as a pulley I mounted upon a supplemental shaft I′ and connected with the pulley D by the belt I². If it is desired to use the machine in localities where power is not available for driving the machine I provide a pinion J mounted on the supplemental shaft I and a driving gear J′ mounted on a stud shaft J² supported in suitable bearing. The stud shaft J² is provided with a crank wheel J³ for rotating the same by hand and a fly wheel J⁴. To hold the machine in proper position while the blade is being ground I provide the angular brackets K and K′. The forward end of the lower portion of the brackets K and K′ are provided with L-shaped portions K² into which the ledger plate 2 of the mowing machine fits.

K³ is a suitable clamp by which the rear cross bar 3 of the mowing machine is firmly secured to the rear portions of the brackets K and K′.

4 are blades of the mowing machine and 5 are the driving wheels of the mowing machine.

L is a friction wheel mounted upon a suitable stud L′ and designed to bear against the rotatable sleeve C at one side and against one of the drive wheels of the mowing machine at the opposite side.

Having described the principal parts involved in my invention I will briefly describe the operation of the same. A mowing machine is placed in the brackets K and K' by inserting the ledger plate 2 into the L-shaped portion K² of the brackets. The rear bar 3 is then securely clamped by means of the clamps K³ on the rear portion of the bracket. The sleeve C is then operated by means of the driving pulley D which is suitably driven by the mechanism hereinbefore described. The sleeve C in rotating carries with it the emery wheel F which as it rotates is gradually fed longitudinally over the rotating sleeve C by means of the depending portion H' of the spring H held in engagement with the thread of the stationary screw spindle B. When the limit of the movement of the emery wheel has been reached that is to say, when the depending portion H' reaches the end of the thread of the screw spindle B I raise the projection H' of the spring finger H out of engagement with the thread and then slide the emery wheel over the sleeve C to the opposite end thereof. The blades of the mowing machine are simultaneously rotated by means of the friction wheel L which is driven from the sleeve C and drives the driving wheel 5 of the mowing machine.

From this description it will be seen that I have devised a machine whereby the knife blades of a lawn mowing machine may be truly and evenly sharpened from end to end. Such sharpening being accomplished quickly and with a minimum amount of labor. To sharpen the lower blade or ledger plate of the machine it is necessary to remove the plate from the machine and place it in a clamping device such as shown in Fig. 1 of the drawing. The emery wheel is then operated in a similar manner so as to sharpen the ledger plate from end to end.

What I claim as my invention is:

1. A device for sharpening the knife blades of a lawn mowing machine, comprising a holder, means for securing the machine within the holder, means for rotating the knife blades of the machine, a threaded spindle, an emery wheel mounted upon the spindle, means for engaging the emery wheel with the thread of the spindle and means for rotating the emery wheel, as and for the purpose specified.

2. A sharpening device for lawn mowing machine blades comprising a holder, means for securing the machine within the holder, means for rotating the knife blades of the machine, a threaded stationary spindle held in suitable supports, a longitudinally slotted sleeve mounted upon the spindle, an emery wheel slidably held upon the sleeve and means for engaging the wheel with the thread of the spindle so as to impart longitudinal movement thereto, as and for the purpose specified.

3. A device for sharpening lawn mowing machine blades comprising a holder formed by angular bars having end lips designed to receive the ledger plate of the machine, clamps for securing the rear bar of the mowing machine to the rear portion of the angle brackets, an emery wheel suitably mounted and driven in contact with the knife blades and means for imparting longitudinal movement to the emery wheel as and for the purpose specified.

4. In a device of the class described, a stationary screw spindle mounted in suitable end brackets, a longitudinal slotted sleeve rotatably mounted thereon, a supplemental sleeve, an emery wheel secured on the supplemental sleeve and means whereby the sleeve may be engaged or disengaged from the thread of the screw spindle as desired, as and for the purpose specified.

5. In a device of the class described, the combination with a stationary threaded spindle held in suitable brackets, of a longitudinally slotted sleeve rotatably mounted thereon, a supplemental sleeve mounted in the slotted sleeve, an emery wheel secured on the supplemental sleeve and a spring finger secured to the interior periphery of the supplemental sleeve and having a depending portion designed to engage with the thread of the screw spindle, as and for the purpose specified.

WILLIAM FORBES MILLER.

Witnesses:
B. BOYD,
R. COBAIN.